United States Patent [19]

Gass

[11] Patent Number: 5,000,336

[45] Date of Patent: Mar. 19, 1991

[54] EXPLOSION PROTECTION SYSTEM FOR A CONTAINER

[75] Inventor: Helmut G. Gass, Grand Cayman, Cayman Islands

[73] Assignee: Grover-Turtur Venture, Houston, Tex.

[21] Appl. No.: 517,552

[22] Filed: Apr. 23, 1990

Related U.S. Application Data

[63] Continuation of Ser. No. 175,407, Mar. 30, 1988, abandoned.

[30] Foreign Application Priority Data

Sep. 4, 1987 [AT] Austria .................. 2245/87

[51] Int. Cl.⁵ .......................... B65D 25/00
[52] U.S. Cl. ................... 220/88.1; 220/88.2
[58] Field of Search ............... 220/88 R, 88 A

[56] References Cited

U.S. PATENT DOCUMENTS

| | | | |
|---|---|---|---|
| 796,183 | 8/1905 | Bradford | 29/6.1 |
| 1,266,665 | 5/1918 | Davis | 220/88 A |
| 3,349,953 | 10/1967 | Conway | 220/85 |
| 3,356,256 | 12/1967 | Szego | 220/88 R |
| 3,650,431 | 3/1972 | Stewart | 220/88 R |
| 3,661,295 | 5/1972 | Grunwald et al. | 220/88 A |
| 3,708,330 | 1/1973 | Harr | 220/88 R |
| 4,013,190 | 3/1977 | Wiggins et al. | 220/88 R X |
| 4,149,643 | 4/1979 | Szego | 220/88 |
| 4,179,027 | 12/1979 | Weisberg | 220/88 R X |
| 4,305,187 | 12/1981 | Iwamura | 29/6.1 |
| 4,361,190 | 11/1982 | Szego | 169/48 |
| 4,486,927 | 12/1984 | Hunter | 29/6.1 |
| 4,613,054 | 9/1986 | Schrenk | 220/88 R |
| 4,621,397 | 11/1986 | Schrenk | 29/6.1 |
| 4,764,408 | 8/1988 | Stedman et al. | 220/88 R |

FOREIGN PATENT DOCUMENTS

| | | | |
|---|---|---|---|
| 378926 | 10/1985 | Austria . | |
| 705745 | 3/1965 | Canada | 220/88 R |
| 836363 | 3/1970 | Canada | 215/1 |
| 1072403 | 2/1980 | Canada | 113/32 |
| 1082533 | 7/1980 | Canada | 113/61 |
| 1150682 | 7/1983 | Canada | 217/35 |
| 0003657 | 8/1979 | European Pat. Off. . | |
| 3322328 | 1/1985 | European Pat. Off. . | |
| 8500113 | 1/1985 | European Pat. Off. . | |
| 2212263 | 10/1972 | Fed. Rep. of Germany . | |
| 3435457 | 4/1986 | Fed. Rep. of Germany | 220/88 R |
| 2990/84 | 5/1987 | Fed. Rep. of Germany . | |
| 3322378 | 4/1894 | Netherlands . | |
| 2028129 | 3/1980 | United Kingdom . | |

OTHER PUBLICATIONS

Woellner Enterprises S-can sales brochure.

Primary Examiner—Steven M. Pollard
Attorney, Agent, or Firm—Pravel, Gambrell, Hewitt, Kimball & Krieger

[57] ABSTRACT

The invention concerns a process for the manufacture of an explosion protection system for a container for inflammable liquid for gaseous substances, whereby individual sections on the surface of a foil strip that is made of a material with good heat-conducting properties, are permanently bent out of the plane of the untreated foil strip; from the such treated foil strip, at least one three-dimensional filling piece with a large interior surface is manufactured by division and/or deformation and said filling piece is inserted into the container, therefore filling at least the major part of the interior space of the container, as well as an explosion protection system of that kind.

6 Claims, 2 Drawing Sheets

EXPLOSION PROTECTION SYSTEM FOR A CONTAINER

This is a continuation of co-pending application Ser. No. 07/175,407 filed on Mar. 30, 1988, now abandoned.

Applicant claims convention priority based upon the identical application, number 2245/87, filed in Austria on Sept. 4, 1987.

Field of the Invention and Prior Art

In the last few years, it has become known from several papers, some of which are described later, that in containers for liquid and gaseous substances that are easily inflammable and therefore pose an explosion hazard, a three-dimensional lattice-like shape made of metal, especially light metal, can be inserted, therefore avoiding a local overheating of the substance in the container by a quick heat conduction and therefore, in case of an accident, permitting a fire to occur but not explosions.

For example, it is known from WO-A1-85/00113 to fill the tanks for combustible liquids or gasses with safety elements that possess a good heat or electric conductivity. The safety elements are in the shape of bottle brushes and in many different shapes with laminations, spheres, cubes, etc., as well as general type filling pieces that extend in one direction only to permanently exceed the diameter of the largest opening of the container, therefore permitting the later filling of existing tanks or similar containers through existing openings in these containers.

An explosion protection system for a container is known from EP-A1-3657, which, in addition to the partial filling with a stretched metal network, has an exterior coating of heat insulating and expanding substance.

An arrangement to reduce or avoid explosions in high pressure containers for combustible liquids is known from CA-PS-1 150 682. The closed container that consists of heat conducting walls, is fitted with an equally heat conducting interior lining that extends into the material stored in the container and is permeable to it. Stretched aluminum foil is given as the material for the interior lining, which occupies approximately 2% of the interior space of the container.

CA-PS-836363 deals with a process or an explosion protection system of a known type, whereby a stretched lattice-like network with good heat conductive properties forms a filling piece for the interior space of a container, which is extensively filled by the filling piece and guaranties the free flow of the liquid. In view of the strength requirement or the natural stability of the filling piece, the latter is made of coiled parts, which are built up of base foils of different thicknesses. Some of the regular mesh structures of the individual coiled pieces are also made with mesh openings of different sizes, whereby the possibly larger mesh openings that in view of the natural stability occur in the thicker base material, obstruct the flow to a lesser extent.

An arrangement that is very similar to the one in the last-named paper is also known from US-PS-3 356 256, whereby this paper also indicates a composition of the filling pieces of individual coiled pieces of different thicknesses and mesh honeycombs of different sizes.

Another explosion protection systems for containers for inflammable substances is known from GB-A-2 028 129, in accordance to which stretched aluminum foil in filling pieces—cylindrical and spherical filling pieces are explicitly dealt with—is used to fill containers that are already in use.

All of the known arrangements of the above-mentioned types or of the type mentioned at the beginning as well as the associated manufacturing processes have one disadvantage in common, namely, that the filling that was originally placed into the container, especially in containers that are used on a non-stationary basis or containers that are exposed for other reasons to vibrations and movements, do not really remain stable over a long period of time and therefore subject to compounding; this may, as a function of the extent of the deformation and therefore the retraction of the network, whose heat conducting properties are needed in the case of an emergency from specific areas of the interior space of the container, cause a reduction in or the loss of its effectiveness regarding explosion protection. However, this problem may not be solved by simply increasing the wall thickness of the base material or the foil strip used for the manufacture of the filling piece, since, on the one hand, the weight and the volume of the filling piece increase immediately and the filling volume that is available for the substance in the container decreases accordingly and, on the other hand, it has been determined that the caking of the filling is at most delayed but not avoided.

The purpose of this invention is improved the process or the explosion protection system of the type mentioned at the beginning in such a manner, that the disadvantages named do not occur and that filling pieces may be manufactured as a part of the explosion protection system that keep their natural stability during rough treatment and over a long period of time and that safely fill the interior space of the container.

SUMMARY OF THE INVENTION

For the manufacture of an explosion protection system for a container for inflammable substances, individual areas of a foil strip made of a material with good heat conducting properties are formed out of the plane of the foil strip, whereby by means of division and/or deformation at least one three-dimensional filling piece with a large interior surface is manufactured and then inserted into the interior space of the container for the purpose of filling it out. The arrangement or the formation of the individual deformed areas is irregular, which permits the manufacture of a filling piece that keeps its natural stability during the use of the container and that is not subject to compounding caused by the release of individual areas in the interior space of the container.

This invention achieves its purpose by forming and/or arranging the individual sections in an irregular manner during the process phase where the individual sections on the surface of the foil strip are permanently bent out of the plane of the untreated foil strip, therefore creating a filling piece from the such treated foil strip, that keeps its natural stability during the use of the container. In accordance with the invention, the explosion protection system itself is developed such, that the construction and/or arrangement of the individual deformed sections is irregular. Therefore, the invention starts with the idea that the caking or the compound of the filling pieces that serve an explosion protection—it makes no difference, if one deals with an individual filling piece that is adapted to the shape of the interior shape of the container or with a multitude of smaller filling pieces that have been inserted into the container after its manufacture—is, in the first place, not the result of a lack of strength or stability of the foil strip material, but the result of the direct fitting or the always regular shapes on the surface of the foil strips that have already been treated in accordance with one of the above mentioned methods. The individual sections on the surface of the foil strip that have been permanently bent out of the plane of the untreated foil strip as described, may also continuously slide into each other in some areas during the manufacture of the coiled pieces or similar, thereby causing a "lumping together" of the material—not unlike stackable furniture or similar—and this, in turn, may be the immediate cause for the fact that there will be areas in the interior space of the container without any filling, making them an explosion hazard. A design in accordance with the invention assures that the fitting into each other of the individual sections on the surface of the treated foil strip cannot occur, therefore producing a definite three-dimensional filling piece that keeps its natural stability without any stiffening or thickening of the material itself and that does not lose its effectiveness as an explosion protective device if the container is subject to movements or is exposed to vibrations.

A further development of the process in accordance with the invention provides for individual filling pieces with a natural stability that have been extensively matched to the interior space of the container and that have been inserted into the container before the final assembly. This filling piece may, for example, be manufactured by simply coiling the treated foil strip as described at the beginning, and also by crumpling up or by pressing into forms or similar. It is important that no area-related compounding of the formed shapes on the surface of the foil strip can occur during the manufacture in accordance with the invention to ascertain, that the explosion protection system can function under any operating conditions.

A further development of the process in accordance with the invention provides that several filling pieces with natural stability are manufactured, whose dimensions are small in relation to the dimensions of the container and that are inserted into the container through a filling opening or similar. If provided in accordance with the invention, these filling pieces may again be manufactured in many ways and offer the advantage, that compounding with adjacent areas cannot occur even with the small sections on the deformed surface of the foil strip, therefore also assuring the natural stability of small filling pieces and at the same time eliminating the danger that several filling pieces may fit into each other because of surface structures of equal shape; this does not only cause the earlier described caking of the filling, but also poses the danger that stable bridge-like supports or similar occur in the container, therefore creating cavities whose space cannot be filled with filling pieces that serve to protect from explosion hazards during the filling or the operation.

A further design of the last named process phase provides for the shape of the filling pieces to be of a rotational form, especially spheres or cones. The use of rotational forms favors the filling of the container with the filling pieces, since a safe and regular filling is assured due to the lack of any bulky contours. In addition to this, it is only natural that it is easier to make rotational forms from the foil strips that have been treated as described.

A design in accordance with the invention of the explosion protection system itself, whereby the three-dimensional filling piece is formed of a stretched network, is as a further development of the invention, characterized by the fact that the stretched network shows an irregular mesh structure and especially honeycombs of different sizes and in an irregular arrangement. A simple manufacturing process for the individual bent sections on the surface of the foil strip is therefore assured, whereby these areas nevertheless maintain their favorable arrangement in accordance with the basic concept of the invention and therefore guarantee the effectiveness of the explosion protection system.

DESCRIPTION OF THE DRAWINGS

In the following, the invention is explained further with the help of a drawing that schematically represents some design examples. A part of a regular stretched network in accordance with the latest state of technology is shown in FIG. 1.

DESCRIPTION OF THE PREFERRED EMBODIMENT

Figure 1:
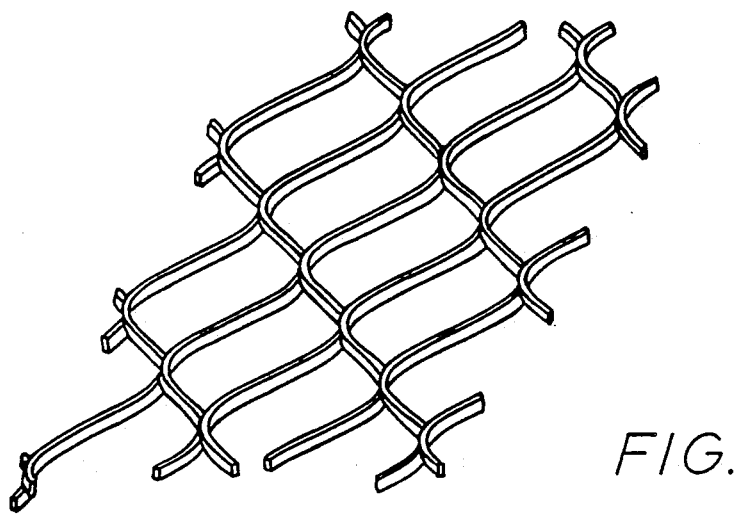
Figure 5:
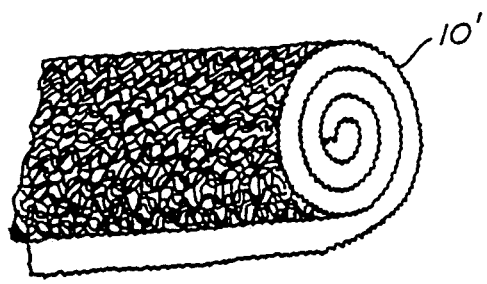
FIG. 5 and FIG. 6 show differently constructed individual filling pieces for the fabrication of an explosion protection system in accordance with the presented invention and FIG. 7 shows an oblique view of a preformed surface of a foil strip made of a material with good heat conductive properties for the manufacture of another explosion protection system in accordance with the invention.
Figure 6:
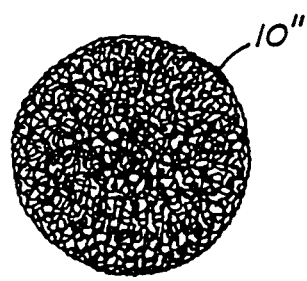

Referring now to the drawings, the network shown in FIG. 1 and consisting of aluminum foil as a base material is usually manufactured by providing a strip of foil of the base material with intermittent cuts of equal length and arranged in a longitudinal direction or may be also in a cross-direction, whereby this precut foil strip is stretched in a direction perpendicular to the direction of the cuts. This may be done on a continuous basis with suitable equipment or step-by-step for individual sections; in this connection, it does not matter which method is chosen. It is essential to know that the individual network holes or the webs between the network holes of this regular network shown in FIG. 1 have a tendency to slide into each other during the formation of filling pieces for a container such as the one shown in FIG. 4, causing the compounding of the network in the filling pieces especially due to the influence of vibrations and other movements of the container, which therefore do not completely fill the container any more. It makes no difference if that respective filling piece consists of one coiled piece or several coiled pieces (as indicated in FIG. 4) or of a formed piece as shown in FIG. 5 or FIG. 6.

Figure 2:
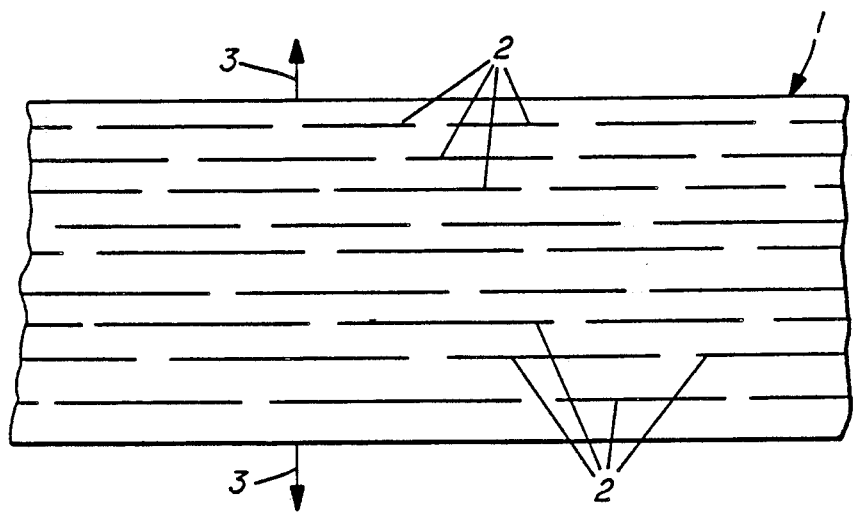
FIG. 2 shows a top view of an already precut foil strip, which has been provided with irregular cuts by the process in accordance with the invention.

In accordance with FIG. 2, the foil strip 1 made of a material with good heat conductive properties is provided with longitudinal cuts that are irregular in arrangement and length, which may, for example, be produced by reciprocally rotating cutting rollers or similar (not shown here). After that process phase the foil strip 1 with the longitudinal cuts 2 is stretched in a cross-direction in the direction of the arrow 3, forming a network in accordance with FIG. 3, that now exhibits honeycombs 5 of different sizes and in an irregular arrangement, which are surrounded by individual areas 6 that are permanently formed out of the plane of the untreated foil strip 1 and form the webs. It must be pointed out in that connection that the width of these areas 6 or their webs is not shown to scale in FIG. 3—the foil strips or the networks would normally be shown with web widths as indicated in FIG. 1; however, the irregularities in accordance with the invention would be less distinct than as shown in FIG. 3.

Figure 3:
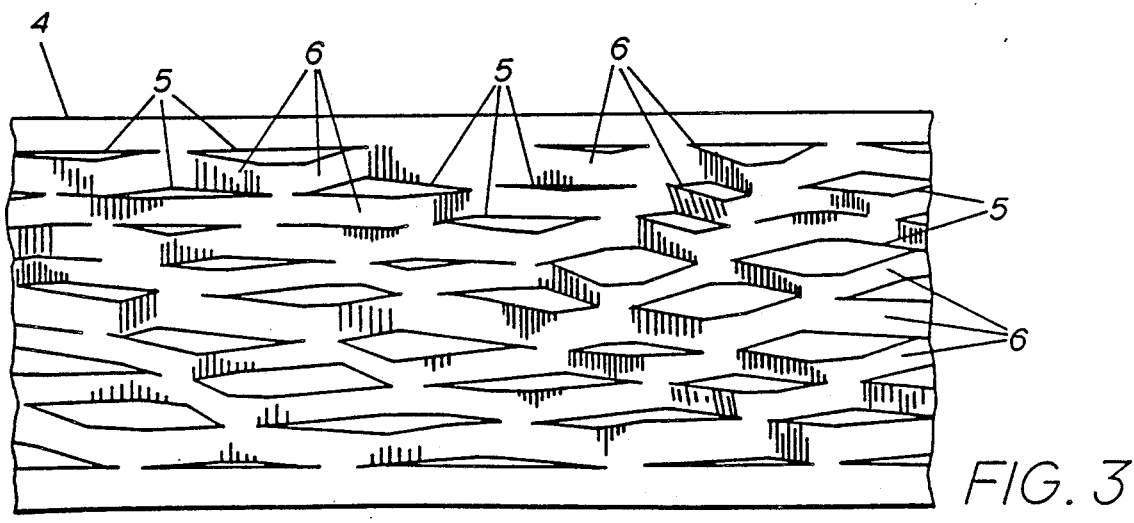
FIG. 3 shows a top view of the foil strip that has already been stretched in a vertical direction to the cuts shown in FIG. 2.

If the network 4 shown in FIG. 3 is now made into a three-dimensional filling piece by means of coiling, rolling, crumpling, forming, compressing etc., it is assured that, because of the irregular honeycombs 5, whose arrangement may be repeated after a complete revolution of a cutting roller or similar, the sliding into each other and therefore the compounding of the individual honeycombs 5 or the areas 6 is impossible; the finished filling piece remains therefore very stable even if the material for the foil strip is then (for example, thickness of between 0.06 and 0.08 mm are typical for aluminum foil strips) and offers therefore the best possible explosion protection for the container.

Figure 4:
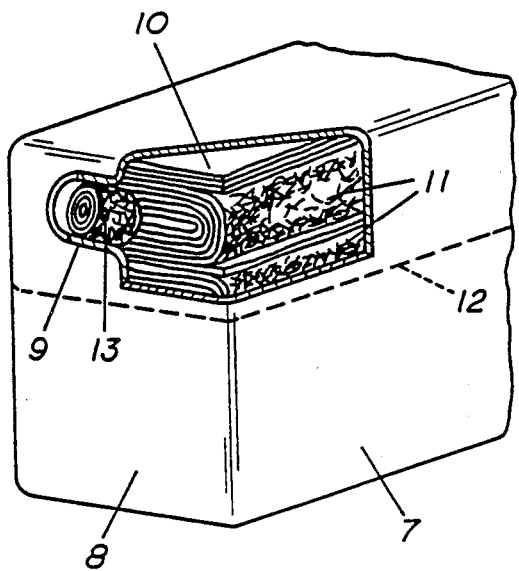
FIG. 4 shows a partial cross-section of a container with an explosion protection system in accordance with the invention.

The container 7 shown in FIG. 4 may, for example, be used as a fuel tank in a vehicle. It has an exterior wall 8 that is usually made of metal, to which a filler neck 9 is attached at the top. Additional openings such as, for example, for fuel level indicator and the connections for the container 7 are not shown. A three-dimensional filling piece 10 consisting here of some coiled pieces 11 that is permeable to the substance to be filled into the tank, e.g. fuel, is placed into the interior space of the container 7; the coiled pieces may have been formed by simply crumpling the network 4 shown in FIG. 3 and then installed in the container 7 before its final assembly. A weld for the permanent closing of the container 7 is indicated as 12. A rolled plug 13, which may also be made of the network 4, is also inserted in the filler neck 9.

In the application of an aluminum foil with a thickness ranging from 0.06 to 0.08 mm, which has been described above as an example, a filling piece 10 made of a network as shown in FIG. 3 occupies approximately 2 to 3% of the filling piece 10 and the large number of honeycombs 5 that can be freely penetrated, the substance filled can move practically freely in the container. A local heating up that may start at the exterior wall 8 quickly dissipates over a large area and therefore over a large volume of the interior space of the container because of the excellent heat conductivity of the filling piece material, partly because of the direct contact the network has with the exterior wall and partly by means of the liquid that is in contact with the inside of the exterior wall; the conditions that may encourage the occurring of explosions are therefore avoided in most cases.

The individual filling piece 10', 10", that are shown as a cylinder in FIG. 5 and as a sphere in FIG. 6 may, for example, also be made of the network 4 in accordance with FIG. 3—these filling pieces 10', 10" have smaller dimensions that the opening of the filling neck 9, therefore permitting the later installation of the total filling volume that consists of many such filling pieces into an already manufactured container or a container that remains in a vehicle. As can be seen in FIG. 4, this indicates that the weld 12 can be made before the installation of the filling pieces—in place of a few coiled filling pieces, the interior space of the container will be filled with many of the small filling pieces 10', 10". The above-mentioned advantages in the manufacture of large individual filling pieces hold of course also true in connection with the manufacture of many small filling pieces; by making the compounding of the individual honeycombs or network webs between the honeycombs impossible by means of their irregular formation or arrangement, the filling pieces again retain their natural stability and therefore make the filling volume for the explosion protection of the container also retain its natural stability.

Figure 7:
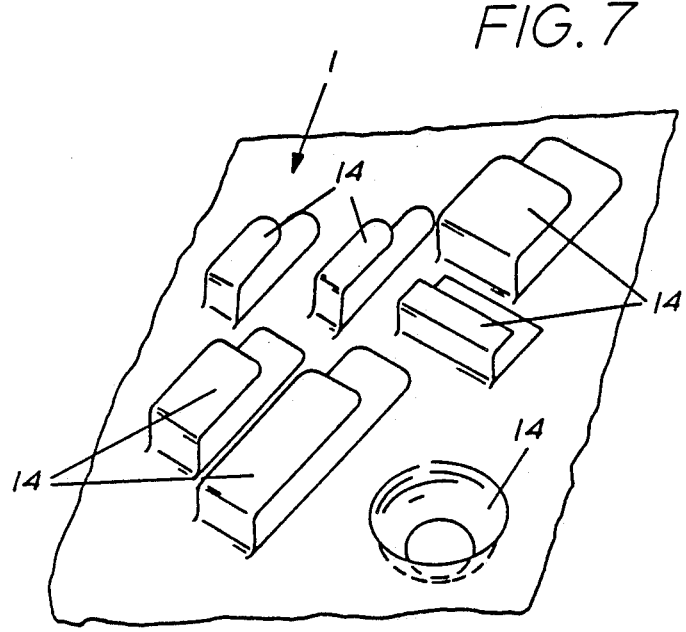

A foil strip 1 that has been preformed in a different manner is shown in FIG. 7, according to which it has been provided with permanently punched out holes 14 on one side instead of being developed as a network. These punched out holes 14 may be made in one working step, for example, between two rotating rollers out of the plane of the untreated foil strip 1—many different shapes and sizes of punched out holes 14 are possible, which again has the advantage that the compounding of regular surface areas is impossible during the forming of the finished filling pieces from the preformed foil material. A hemispherically shaped perforated type of punched out hole 14 is shown in the lower right corner of FIG. 7, which represents another possibility for the manufacture of a filling piece that retains its natural stability.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. An explosion protection system for inflammable substances with a plurality of discrete permeable three-dimensional filling pieces made of a material with good heat conducting properties and each formed from a foil strip with permanent individual areas on the surface, that are deformed out of the plane of the untreated foil strip, and that are arranged in the interior space of the container, characterized by the fact, that the formation and/or the arrangement of the individual deformed areas are irregular.

2. An explosion protection system in accordance with claim 1, whereby the three-dimensional filling pieces are formed of a stretched network, characterized by the fact, that the stretched network has an irregular mesh structure.

3. An explosion protection system in accordance with claim 2, characterized by the fact, that the stretched network (4) consists of honeycombs (5) that are of different sizes and are irregularly arranged.

4. A process for the manufacture of an explosion protection system for a container of inflammable liquid or gaseous substances, comprising the steps of:
 (a) providing an elongated foil strip of material having good heat conductive properties;
 (b) forming a plurality of openings in the foil strip of material;
 (c) crumpling the foil strip of material into a discrete element; and (d) inserting a plurality of the discrete elements into the interior space of the container, filling at least a major part of the interior space of the container, wherein the openings are irregularly formed.

5. The method of claim 4, wherein the openings are irregularly arranged.

6. A process for the manufacture of an explosion protection system for a container of inflammable liquid or gaseous substances, comprising the steps of:

(a) providing an elongated foil strip of material having good heat conductive properties;

(b) forming a plurality of openings in the foil strip of material;

(c) crumpling the foil strip of material into a discrete element; and (d) inserting a plurality of the discrete elements into the interior space of the container, filling at least a major part of the interior space of the container, wherein in step "b" the foil strip is cut with a plurality of longitudinal cuts of differing lengths and the foil strip is then laterally stretched to form a honeycomb network of irregular openings in the foil.

* * * * *